United States Patent Office 2,928,810
Patented Mar. 15, 1960

2,928,810

ALIPHATIC ALCOHOL-EPOXIDE RESIN COMPOSITIONS

William J. Belanger, Louisville, Ky., assignor to Devoe & Raynolds Company, Inc., a corporation of New York No Drawing. Application November 15, 1957
Serial No. 696,603

7 Claims. (Cl. 260—47)

This invention relates to aliphatic alcohol-epoxide resin compositions. In one of its embodiments, this invention is directed to an improved process for obtaining such compositions. In another of its aspects, the invention pertains to novel, stable, curable comopsitions of matter.

In the preparation of adhesives, coating compositions, molding compositions, and the like, from epoxide resins, it has been found desirable to use aliphatic polyhydric alcohols as cross-linking reactants for the epoxide resins as set forth in Greenlee patent U.S. 2,731,444. That patent provides that aliphatic polyhydric alcohols are polyfunctional cross-linking reactants which serve to cross-link different molecules of the epoxide resin to form long chain high molecular weight polymeric products. Reaction products differing widely in characteristics are produced with different polyhydric aliphatic alcohols and with different proportions of epoxide resins and polyhydric alcohols. Aliphatic polyhydric alcohols are reacted with epoxide resins in less than equivalent amounts, in equivalent proportions of polyhydric alcohols and epoxide resins, and with an excess of polyhydric alcohol being reacted with epoxide resins. Greenlee points out that depending upon the conditions of reaction and the presence of a catalyst, such as alkali catalysts, in varied amounts, the reaction products may be higher melting point epoxide resins or the reaction may go the point of forming insoluble, infusible products.

For the reaction of epoxide resins with polyhydric alcohols, alkali catalysts such as the sodium phenoxides are suggested by Greenlee. In accordance with this invention, however, it has been found that quaternary ammonium salts of strong acids, which are neutral, have certain advantages over sodium phenoxide. In one embodiment, premixed molding compositions and such products as solder sticks are provided, formed by heating the alcohol-polyepoxide-catalyst blend until a slight exotherm is observed, and cooling. Using neutral quaternary ammonium salts, the reaction, being more uniform and easier to control, can be stopped at an intermediate stage to form an excellent body solder for the automotive industry. Other body solders do not contain the alcohol. Using sodium phenoxide and similar alkaline catalysts, the reaction is more unmanageable and would be difficult to stop at the intermediate stage. Greenlee in U.S. 2,731,444 shows that aliphatic polyhydric alcohols react with epoxide resins without the use of a catalyst. However, properties, particularly strength properties, are improved by the utilization of a catalyst, making the use of a catalyst practically essential. In addition, shorter curing times than those obtained without a catalyst are oftentimes preferred.

Thus, it has been found that quaternary ammonium salts of strong acids are capable of promoting the reaction between the aliphatic polyhydric alcohols and epoxide resins. These quaternary ammonium salts have the advantage of being neutral and in admixture with the polyhydric alcohol-epoxide resin composition, they are more stable than alkaline catalysts.

The invention thus provides a process for curing epoxide resins which includes mixing and reacting the epoxide resin with an aliphatic polyhydric alcohol and an activator comprising a neutral salt, i.e., a quaternary ammonium salt of a strong acid, preferably a quaternary ammonium hydroxide. By strong acid is meant an acid having a pK value of below 3.5.

Polyepoxides with which this invention is concerned are now well known and need not be discussed at length herein. The most useful of these epoxide resins is made from the reaction of a polyhydric phenol with epihalohydrin or glycerol dihalohydrin and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)-ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of halohydrin to dihydric phenol being at least about 1.2 to 1, up to around 10 to 1.

Higher melting point resins are made from the reaction of such resins with a further amount of dihydric phenol less than that equivalent to the epoxide content of the resin, as set forth in U.S. Patent 2,615,008. Epihalohydrins can be further exemplified by 3-chloro-1,2-epoxy butane, 3-bromo-1,2-epoxy hexane, 3-chloro-1,2-epoxy octane and the like. Another group of polyepoxides is produced by the reaction of a polyhydric alcohol with epichlorhydrin or glycerol dichlorhydrin as described in Zech patent U.S. 2,581,464. Any of the various polyepoxides made from phenols or alcohols and epichlorhydrin as described can be used in accordance with this invention. It is preferred, however, to employ a polyepoxide having a weight per epoxide below one thousand.

Any of the known aliphatic polyhydric alcohols, such as are disclosed in U.S. 2,731,444, can be used in the practice of this invention, for example, ethylene glycol, polyoxyethylene glycol, tetraethylene glycol, dipentaerythritol, mannitol, triglycerol, hexylene glycol, isobutylene glycol, 1,12-dihydroxy octadecane, pentaerythritol, and erythritol.

The invention thus contemplates the use of polyhydric aliphatic alcohols or ethers, that is, polyhydric alcohols containing only carbon, hydrogen and oxygen and free of oxygen-containing groups other than ether oxygen and hydroxyl groups. Polyhydric alcohols are diols, such as 1,2-propanediol, 1,3-butanediol, 1,4-butanediol, 1,5-pentanediol, pinacol, trimethylene glycol, tetramethylene glycol, isobutylene glycol, pentamethylene glycol, glycerol, and polyols, such as 1,2,3-propanetriol, cyclopentanediol, butanetriol-1,2,3, pentaglycerol, adonitol and sorbitol. Ether-alcohols within the contemplation of the invention are the polyoxyalkylene glycols such as polyoxyethylene glycol, polyoxypropylene glycol, particularly mixtures of polyoxyethylene glycols. Polyoxyethylene glycol mixtures are readily available commercially, mixtures having average molecular weights of one hundred or less up to four thousand and more being obtainable.

Quaternary ammonium salts within the contemplation of this invention are tetraalkyl, aryl trialkyl and alkaryl trialkyl ammonium salts of strong acids wherein the aryl, alkaryl and alkyl substituents each have no more than eight carbon atoms. Examples of such quaternary ammonium compounds include benzyltrimethyl ammonium chloride, benzyltrimethyl ammonium phosphate, trimethyl benzyl ammonium sulphates, benzyl triethyl ammonium chloride, tributyl benzyl ammonium chloride, tripropyl benzyl ammonium chloride, tolyl trimethyl ammonium chloride, octyl trimethyl ammonium bromide, ethylene bis(trimethyl ammonium bromide), etc., preferred salts being quaternary ammonium halides. Also intended are ion exchange resins containing quaternary ammonium salts of strong acids.

In carrying out the process of this invention the polyepoxide is cured by admixing therewith the polyhydric alcohol or ether as well as the quaternary ammonium salt. The amount of alcohol to be used in the process depends, of course, on many factors such as the type of product desired. As indicated hereinbefore, equivalent amounts, less than equivalent amounts or greater than equivalent amounts of alcohol and polyepoxides can be used, an equivalent amount being the amount of alcohol required to etherify all of the epoxide, that is, one alcoholic hydroxyl per epoxide group. Higher molecular weight polymeric polyhydric alcohols can be prepared by reacting equivalent or greater than equivalent amounts of alcohol with polyepoxide in the presence of quaternary ammonium salts of strong acids. Epoxy or hydroxy terminated polymers can be prepared by varying the proportions of the polyhydric alcohol. Thus, one mol of the diglycidyl ether of bisphenol can be reacted with two mols of pentaerythritol to form an octahydric alcohol. Another polyhydric alcohol can be prepared from three mols of pentaerythritol and two mols of the diglycidyl ether of bisphenol. This polyhydric alcohol can be conveniently esterified with soya bean oil fatty acids to prepare an ester. The quaternary ammonium salts, on the other hand, are needed only in very small amounts, excellent results being obtained when the activator is utilized in amounts of from 0.1 to 10 percent by weight of the resin, i.e., resin containing both polyepoxide and polyhydric alcohol.

In effecting the cure, for example, when equivalent amounts of polyepoxide and alcohol are used, that is, one epoxide per hydroxyl group, the temperature range will vary with the particular polyhydric alcohol and the amount of quaternary ammonium salt used. Excellent rates of cure are obtained at temperatures ranging from about 100° C. to 200° C. and these are the preferred temperatures to be used. Temperatures much above 200° C. are generally not desirable, but they may be employed if necessary, temperatures of 160° C. to 175° C. being preferred. Thus, it is understood that well cured resins result from the use of hydroxyl groups in equivalent or less than equivalent amounts with respect to the number of epoxide groups. With excess hydroxyl groups thermoplastic products result which are probably high molecular weight polyhydric alcohols.

The invention can perhaps be better understood, however, by reference to specific examples. These examples are intended to be exemplary only, as they are not intended to illustrate all aspects of the invention.

The polyepoxides employed in the following examples are prepared in the manner described in U.S. Patents 2,615,007, 2,615,008, and 2,582,985 by the condensation of varying proportions of epichlorhydrin to bisphenol and subsequent dehydrohalogenation with sodium hydroxide.

The table which follows indicates the ratio of epichlorhydrin to bisphenol used to prepare the polyepoxides and in the examples which follow the polyepoxides will be referred to by their epoxide equivalencies, e.g., an epoxide with an epoxide equivalent of 190 will be called Epoxide 190.

| Epoxide | Ratio | | Epoxide Equivalent |
|---|---|---|---|
| | Epichlorhydrin | Bisphenol | |
| 190 | 10 | 1 | 190 |
| 964 | 1.21 | 1 | 964 |
| 1,750 | 100 parts of Epoxide 964 plus 5 parts of Bisphenol. | | 1,750 |

*Example 1*

In a suitable container, 95.0 grams (0.25 mol) of Epoxide 190, 5.0 grams (0.037 mol) of pentaerythritol, and 2.5 grams of a sixty percent aqueous solution of benzyltrimethylammonium chloride are combined and heated at 160–175° C. until all of the pentaerythritol is in solution. This composition corresponds to an epoxy to hydroxy ratio of 3.4 to 1. The solution is poured into an aluminum cup and is baked for three hours at 180° C. to obtain a casting with good impact strength.

*Example 2*

As shown in Example 1, from a composition with an epoxy to hydroxy ratio of 1.6 to 1, prepared by combining 90.0 grams (0.237 mol) of Epoxide 190, 10.0 grams (0.074 mol) of pentaerythritol, and 10.0 grams of a sixty percent aqueous solution of benzyltrimethylammonium chloride, a casting with an impact strength of 1.03 ft. lb. per inch of notch is obtained by heating for three hours at 180° C.

*Example 3*

A casting with an impact strength of 0.97 foot pound per inch of notch is prepared, as in Example 1, from 85.0 grams (0.224 mol) of Epoxide 190, 15.0 grams (0.110 mol) of pentaerythritol, and 2.5 grams of a sixty percent aqueous solution of benzyltrimethyl ammonium chloride. This composition has an epoxy to hydroxy ratio of 1.02 to 1.

*Example 4*

As set forth in Example 1, a casting with an impact strength of 0.24 foot pound per inch of notch is prepared from 80.0 grams (0.21 mol) of Epoxide 190, 20.0 grams (0.147 mol) of pentaerythritol and 2.5 grams of a sixty percent aqueous solution of benzyltrimethyl ammonium chloride. This blend corresponds to an epoxy to hydroxy ratio of 0.72 to 1.

*Example 5*

Following the procedure of Example 1, a brittle casting is prepared from 75 grams (0.198 mol) of Epoxide 190, 25 grams (0.184 mol) of pentaerythritol and 2.5 grams of a sixty percent aqueous solution of benzyltrimethyl ammonium chloride. The epoxy to hydroxy ratio employed is 0.54 to 1.

*Example 6*

Following the procedure of Example 1, the combination of 70.0 grams (0.184 mol) of Epoxide 190, 30.0 grams (0.220 mol) of pentaerythritol and 2.5 grams of a sixty percent aqueous solution of benzyltrimethyl ammonium chloride yields a polymeric polyhydric alcohol with a Durrans' melting point of 111° C. In this case an epoxy to hydroxy ratio of 0.42 to 1 exists.

*Example 7*

Into a 500 ml. round bottomed, three necked flask equipped with an agitator and thermometer are charged 96.4 grams of Epoxide 964, 3.6 grams (0.026 mol) of pentaerythritol and 67.0 grams of 2-ethoxyethanol acetate. This composition represents an epoxy to hydroxy ratio of 1 to 1. The flask contents are heated slowly until the Epoxide 964 melts, at which time agitation is started and 2.5 grams of a sixty percent aqueous solution of benzyltrimethyl ammonium chloride are added. The reaction mixture is held at 120° C. for thirty minutes after which it is heated for two hours at 150° C. The flask contents are cooled to room temperature and an additional 2.5 grams of a sixty percent aqueous solution of benzyltrimethyl ammonium chloride are blended into the mixture. From this solution a film is drawn down on a glass plate with a two mil blade and is cured by baking at 180° C. for thirty minutes. The cured film is clear and hard and possesses very good adhesion and flexibility properties.

*Example 8*

Following the procedure of Example 7, 98.1 grams of Epoxide 1750, 1.9 grams (0.014 mol) of pentaerythritol, 100.0 grams of 2-ethoxyethanol acetate as a solvent, and 5.0 grams of a sixty percent aqueous solution of benzyltrimethyl ammonium chloride are combined. This composition represents a ratio of 1 epoxy group to 1 hydroxyl group. From the resulting solution, a film is drawn down on a glass plate with a three mil blade and is cured by baking for thirty minutes at 180° C. The cured film is clear and hard and has excellent adhesion and flexibility properties.

*Example 9*

In a suitable container, 180 grams (0.487 mol) of Epoxide 190, 20.0 grams (0.147 mol) of pentaerythritol, and 5.0 grams of a sixty percent aqueous solution of benzyltrimethyl ammonium chloride are combined. This composition has an epoxy to hydroxy ratio of 1.65 to 1. The blend is heated to 350° F. at which point all of the pentaerythritol is in solution and an exothermic reaction is observed. The blend is poured into a mold (preheated at 180° C.) and is cured by baking for three hours at 180° C. The casting which results has the following physical properties:

Tensile strength—9,703 pounds per square inch
Elongation—7.05 percent
Flexural strength—16,229 pounds per square inch
Impact strength—1.03 foot pounds per inch of notch
Rockwell hardness M—65

*Example 10*

In a suitable container, 9.0 grams (0.067 mol) of 1,3,5-hexanetriol and 38.0 grams (0.10 mol) of Epoxide 190, an epoxy to hydroxy ratio of 1 to 1, are combined in the presence of 2.4 grams of a sixty percent aqueous solution of benzyltrimethyl ammonium chloride. The blend is heated at 200° C. and that temperature is maintained until a gel results, a period of one hour, while the identical composition without the catalyst requires about five hours to obtain a gel.

*Example 11*

As described in the procedure of Example 10, 38.0 grams (0.1 mol) of Epoxide 190 and 9.0 grams (0.067 mol) of trimethylol propane, an epoxy to hydroxy ratio of 1 to 1, are combined with 2.4 grams of a sixty percent aqueous solution of benzyltrimethyl ammonium chloride. A gel results after heating for forty-five minutes at 200° C. while the identical composition without the catalyst requires about four hours to gel.

*Example 12*

As described in Example 10, 45.0 grams (0.118 mol) of Epoxide 190 and 5.0 grams (0.037 mol) of pentaerythritol (an epoxy to hydroxy ratio of 1.6 to 1) are combined with 2.5 grams of a sixty percent aqueous solution of benzyltrimethyl ammonium chloride. On heating at 200° C. a gel results in thirty-five minutes while the identical composition, treated in the same manner without the catalyst, requires approximately three hours to obtain a gel.

*Example 13*

Following the procedure of Example 10, 42.5 grams (0.111 mol) of Epoxide 190 and 7.5 grams (0.055 mol) of pentaerythritol, an epoxy to hydroxy ratio of 1 to 1, are combined with 2.5 grams of a sixty percent aqueous solution of benzyltrimethyl ammonium chloride. A gel results after heating at 200° C. for thirty-five minutes, while an identical composition treated in the same manner but excluding the catalyst, gels in approximately three hours.

*Example 14*

In a suitable container, 82.0 grams (0.216 mol) of Epoxide 190 and 18.0 grams (0.071 mol) of dipentaerythritol, an epoxy to hydroxy ratio of 1.01 to 1, are combined in the presence of 5.0 grams of a sixty percent aqueous solution of benzyl trimethyl ammonium chloride. The blend is heated to 360° F. at which temperature the dipentaerythritol goes into solution, the reaction becomes exothermic and gellation occurs after two minutes.

*Example 15*

As set forth in Example 14, 86 grams (0.22 mol) of Epoxide 190, 14.0 grams (0.077 mol) of sorbitol, an epoxy to hydroxy ratio of 0.98 to 1.0, are combined in the presence of 5.0 grams of a sixty percent aqueous solution of benzyltrimethyl ammonium chloride and are heated to 380° F. at which temperature the sorbitol goes into solution. A gel is obtained in two minutes.

*Example 16*

In a suitable container, 190.0 grams (0.5 mol) of Epoxide 190, 20.0 grams (0.147 mol) of pentaerythritol, 20.0 grams (0.149 mol) of trimethylol propane and 10.0 grams of a sixty percent aqueous solution of benzyltrimethyl ammonium chloride are combined. The blend is heated to 180° C., is poured into a mold, and is baked at 180° C. for three hours. The casting of this composition has the following physical properties:

Tensile strength—10,881 pounds per square inch
Elongation—4.8 percent
Flexural strength—18,075 pounds per square inch
Rockwell hardness M—83
Impact strength—1.01 foot pounds per inch of notch
Heat distortion—62° C.
Water absorption—0.50 percent

*Example 17*

As set forth in Example 16, a casting is prepared from 190.0 grams (0.5 mol) of Epoxide 190, 20.0 grams (0.147 mol) of pentaerythritol, and 20.0 grams (0.149 mol) of 1,3,5-hexanetriol, an epoxy to hydroxy ratio of 1 to 1, combined in the presence of 10.0 grams of a sixty percent aqueous solution of benzyltrimethyl ammonium chloride. The composition cured at 180° C. for three hours results in a casting with these properties:

Tensile strength—10,981 pounds per square inch
Elongation—5.4 percent
Flexural strength—16,415 pounds per square inch
Rockwell hardness M—82
Heat distortion—54° C.
Impact strength—0.79 foot pounds per inch of notch
Water absorption—1.1 percent

*Example 18*

As described in Example 16, a casting is prepared from the combination of 170.0 grams (0.44 mol) of Epoxide 190 and 30.0 grams (0.22 mol) of pentaerythritol, an epoxy to hydroxy ratio of 1 to 1, in the presence of 10.0 grams of a sixty percent aqueous solution of benzyltrimethyl ammonium chloride. The casting cured by heating at 180° C. for three hours has the following physical properties:

Tensile strength—11,327 pounds per square inch
Elongation—6.3 percent
Flexural strength—18,958 pounds per square inch Rockwell hardness M—84
Heat distortion—70° C.
Impact strength—1.23 foot pounds per inch of notch
Water absorption—0.5 percent

*Example 19*

Following the procedure of Example 16, a casting is prepared by heating for three hours at 180° C., a blend of 180.0 grams (0.473 mol) of Epoxide 190, 20.0 grams (0.147 mol) of pentaerythritol and 16.0 grams (0.178 mol) of 1,4-butanediol, an epoxy to hydroxy ratio of 1 to 1, in the presence of 10.0 grams of a sixty percent aqueous solution of benzyltrimethyl ammonium chloride. The casting has the following physical properties:

Tensile strength—10,215 pounds per square inch
Elongation—4.1 percent
Flexural strength—16,164 pounds per square inch
Rockwell hardness M—75
Heat distortion—50° C.
Impact strength—0.44 foot pound per inch of notch
Water absorption—1.1 percent

*Example 20*

As set forth in the procedure of Example 16, a casting is prepared from 190 grams (0.5 mol) of Epoxide 190 and 10.0 grams (0.074 mol) of pentaerythritol, an epoxy to hydroxy ratio of 1 to 0.3, combined with 10.0 grams of a sixty percent aqueous solution of benzyltrimethyl ammonium chloride and cured at 180° C. for three hours. The casting has the following physical properties:

Tensile strength—11,742 pounds per square inch
Elongation—6.3 percent
Flexural strength—20,153 pounds per square inch
Rockwell hardness M—88
Heat distortion—73° C.
Impact strength—0.93 foot pound per inch of notch
Water absorption—0.2 percent

*Example 21*

Into a one liter, round bottomed, three necked, flask, equipped with an agitator, thermometer and reflux condenser, are charged 190.0 grams (0.5 mol) of Epoxide 190 and 45.0 grams (0.5 mol) of 1,4-butanediol, an epoxy to hydroxy ratio of 1 to 1. In addition, as a catalyst, 10.0 grams of a sixty percent aqueous solution of benzyltrimethyl ammonium chloride are added. The reaction is heated to 400° F. gradually without utilizing the condenser in order for the water to escape. The condenser is replaced and heating at 400° F. is continued for one hour, after which time the reaction mixture is cooled to room temperature. The resulting resinous product is washed with hot water to remove excess catalyst and unreacted 1,4-butanediol. The resin has a melting point of 69° C. (Durrans' Mercury Method), a weight per hydroxy group of 254 and an epoxide equivalent of 16,300.

*Example 22*

Following the procedure of Example 21, a resinous product is prepared from 190.0 grams (0.5 mol) of Epoxide 190 and 52.0 grams (0.5 mol) of 1,5-pentanediol, an epoxy to hydroxy ratio of 1 to 1. As a catalyst, 10.0 grams of a sixty percent aqueous solution of benzyltrimethyl ammonium chloride is added. The resinous product obtained has a melting point of 81° C. (Durrans' Mercury Method) and a weight per epoxide group of 9,600.

*Example 23*

Following the procedure of Example 21, a resinous product is made from 190.0 grams (0.5 mol) of Epoxide 190 and 100.0 grams (0.5 mol) of a polyethylene glycol with a molecular weight of 200, an epoxy to hydroxy ratio of 1 to 1, in the presence of 10.0 grams of a sixty percent aqueous solution of benzyltrimethyl ammonium chloride. The resulting resinous product has a melting point of 57° C. (Durrans' Mercury Method) and a weight per epoxide group of 5,100.

One of the outstanding advantages of this invention is that the epoxide, quaternary ammonium salt of strong acids, and polyhydric alcohol may be combined and heated to a point just short of the gel point. The reaction is stopped and cooled, resulting in an intermediate resin with a stable shelf life; but on reheating, without further addition of catalyst, curing is accomplished readily. A type of pre-mix or "ready-mix" is therefore possible. Applications are possible in extrusions, moldings, "pre-pregs," etc.

A body solder, applicable for the automotive industry, illustrating this advantage can be prepared by blending polyepoxide, pentaerythritol, and the quaternary ammonium salt. The blend is heated to about 340° F. at which time a slight exotherm is observed. At this point aluminum powder is added at such a rate as to maintain the temperature between 330–350° F. After all of the powder is stirred in, the resinous mixture is cooled to room temperature. The cooled resinous mixture has a Rockwell M hardness of about −5 and can be melted on reheating, indicating that it is not cured. The blend is stable over several weeks and if maintained under refrigeration can be kept for very long periods. However, when a portion is heated to 365° F. for twenty minutes, the resin cures to a hard, tough product which can be machined.

*Example 24*

An epoxy resin solder is prepared from an epoxide and a polyhydric alcohol using an epoxy to hydroxy ratio of 1 to 1, incorporating benzyltrimethyl ammonium chloride and aluminum powder. In a suitable container, 127.5 grams (0.34 mol) of Epoxide 190, 22.5 grams (0.17 mol) of pentaerythritol and 7.5 grams of a sixty percent aqueous solution of benzyltrimethyl ammonium chloride are combined and heated to 340° F. at which time solution of the pentaerythritol is complete and an exothermic reaction is observed. To this melt is added, at such rate as to maintain the temperature between 330–350° F., 250 grams of aluminum powder. After incorporating all of the aluminum powder, the resinous mixture is cooled to room temperature. For use as a stick solder, it may be poured into a mold before cooling. At room temperature, the solder has a Rockwell M hardness of −5 and is stable for a period of four weeks. When a portion of this solder is heated at 365° F. for twenty minutes, the solder composition cures to a hard, tough product capable of being machined.

What is claimed is:

1. In the process for resinifying and curing a glycidyl polyether of a polyhydric compound of the group consisting of polyhydric phenols and polyhydric alcohols, said glycidyl polyether having an epoxy equivalency greater than one, wherein the glycidyl polyether is mixed and heat reacted with a polyhydric aliphatic alcohol containing only carbon, hydrogen and oxygen and selected from the group consisting of aliphatic hydrocarbons substituted only by hydroxyl groups, polyglycols, polyglycerols and polypentaerythritols, said polyhydric alcohols having at least two primary alcoholic hydroxyl groups, the improvement which comprises heat reacting the glycidyl polyether and the polyhydric alcohol and adding as an accelerator for the reaction 0.1 to 10 percent, based on the polyether-alcohol mixture, of an activator consisting of a quaternary ammonium salt selected from the group consisting of tetra-alkyl, aryl trialkyl and alkaryl trialkyl ammonium salts of strong acids wherein the aryl, alkaryl and alkyl substituents have no more than eight carbon atoms.

2. The process of claim 1 wherein the quaternary ammonium salt is a quaternary ammonium halide.

3. The process of claim 1 wherein the quaternary ammonium salt is benzyltrimethyl ammonium chloride.

4. The process according to claim 1 in which the amount of polyhydric alcohol is less than an equivalent amount and in which the reaction is carried to the point of producing a reaction product still containing unreacted epoxide groups, an equivalent amount being one equivalent epoxide per one equivalent alcohol, considering an equivalent epoxide as the weight in grams of polyether per epoxide group and an equivalent alcohol as the weight of alcohol in grams per hydroxyl group.

5. The process according to claim 1 in which the equivalent amount of polyhydric alcohol is used with the glycidyl polyether, with incomplete reaction of alcoholic and epoxide groups to produce an incomplete reaction product still containing unreacted epoxide groups of the resin and hydroxyl groups of the alcohol, an equivalent amount being one equivalent epoxide per one equivalent alcohol, considering an equivalent epoxide as the weight in grams of polyether per epoxide group and an equivalent alcohol as the weight of alcohol in grams per hydroxyl group.

6. The process according to claim 1 in which more than the equivalent amount of polyhydric alcohol is reacted with the glycidyl polyether and in which the reaction is terminated before all of the epoxide groups of the resin are reacted, to give a reaction product containing both unreacted epoxide groups of the resin and hydroxyl groups of the alcohol, an equivalent amount being one equivalent epoxide per one equivalent alcohol, considering an equivalent epoxide as the weight in grams of polyether per epoxide group and an equivalent alcohol as the weight of alcohol in grams per hydroxyl group.

7. A heat curable composition of matter comprising a glycidyl polyether of a polyhydric compound of the group consisting of polyhydric phenols and polyhydric alcohols, a polyhydric aliphatic alcohol containing only carbon, hydrogen and oxygen and selected from the group consisting of aliphatic hydrocarbons substituted only by hydroxyl groups, polyglycols, polyglycerols and polypentaerythritols, said polyhydric alcohols having at least two primarily alcoholic hydroxyl groups, and from 0.1 to 10 percent based on the polyether-alcohol mixture of a quaternary ammonium salt selected from the group consisting of tetraalkyl, aryl trialkyl, and alkaryl trialkyl ammonium salts of strong acids wherein the aryl alkaryl and alkyl substituents have no more than eight carbon atoms.

References Cited in the file of this patent

UNITED STATES PATENTS

| | | |
|---|---|---|
| 2,731,444 | Greenlee | Jan. 17, 1956 |
| 2,752,269 | Condo | June 26, 1956 |
| 2,768,992 | Zukas | Oct. 30, 1956 |